No. 840,006. PATENTED JAN. 1, 1907.
J. MILLER, A. M. HAIGHT & W. T. SMITH.
MACHINE FOR MAKING CONCRETE BUILDING BLOCKS.
APPLICATION FILED SEPT. 11, 1905.
6 SHEETS—SHEET 1.
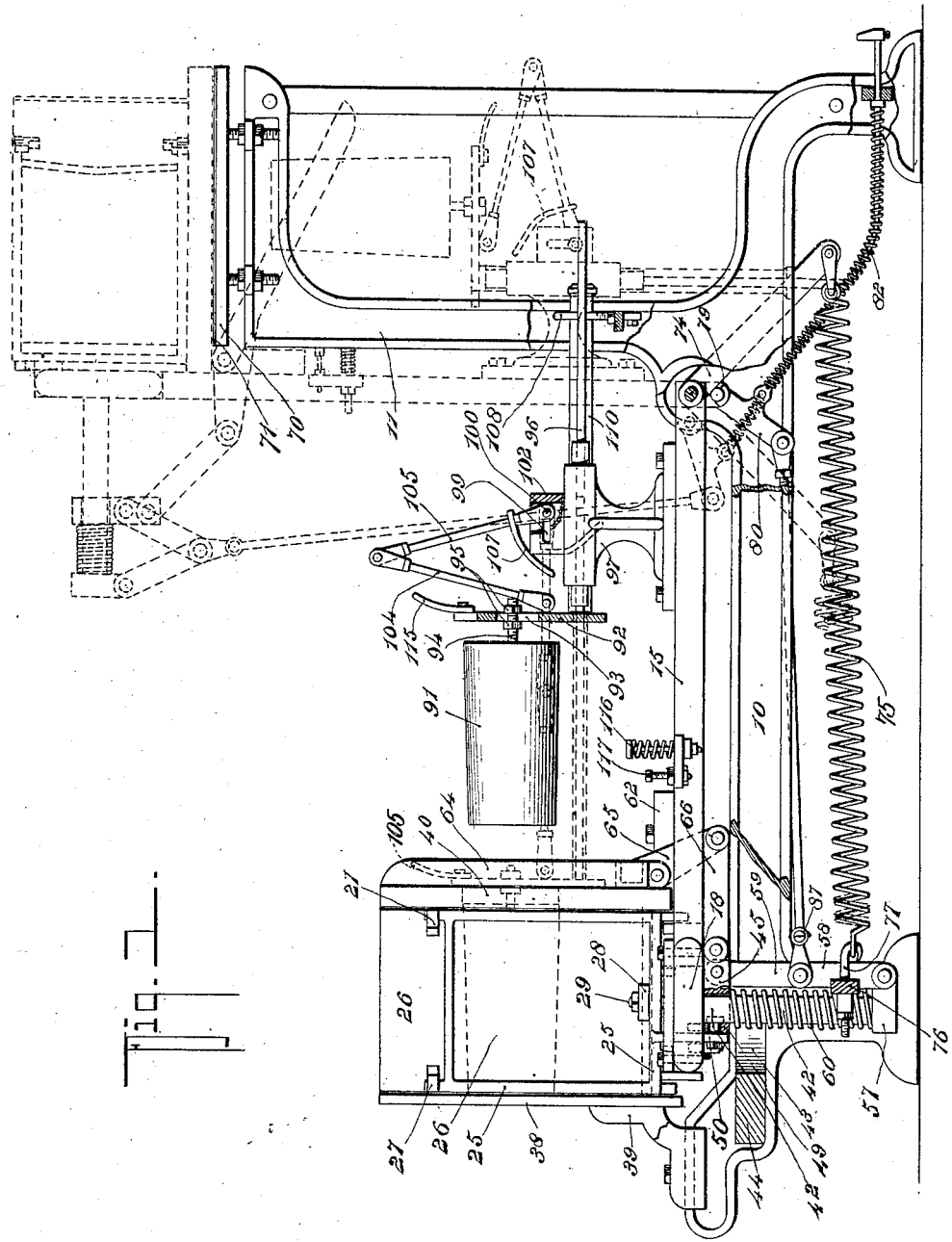
Witnesses
John Miller
Arthur M. Haight and
Walter T. Smith
Inventors
by C. A. Snow & Co.
Attorneys No. 840,006. PATENTED JAN. 1, 1907.
J. MILLER, A. M. HAIGHT & W. T. SMITH.
MACHINE FOR MAKING CONCRETE BUILDING BLOCKS.
APPLICATION FILED SEPT. 11, 1905.
6 SHEETS—SHEET 2.
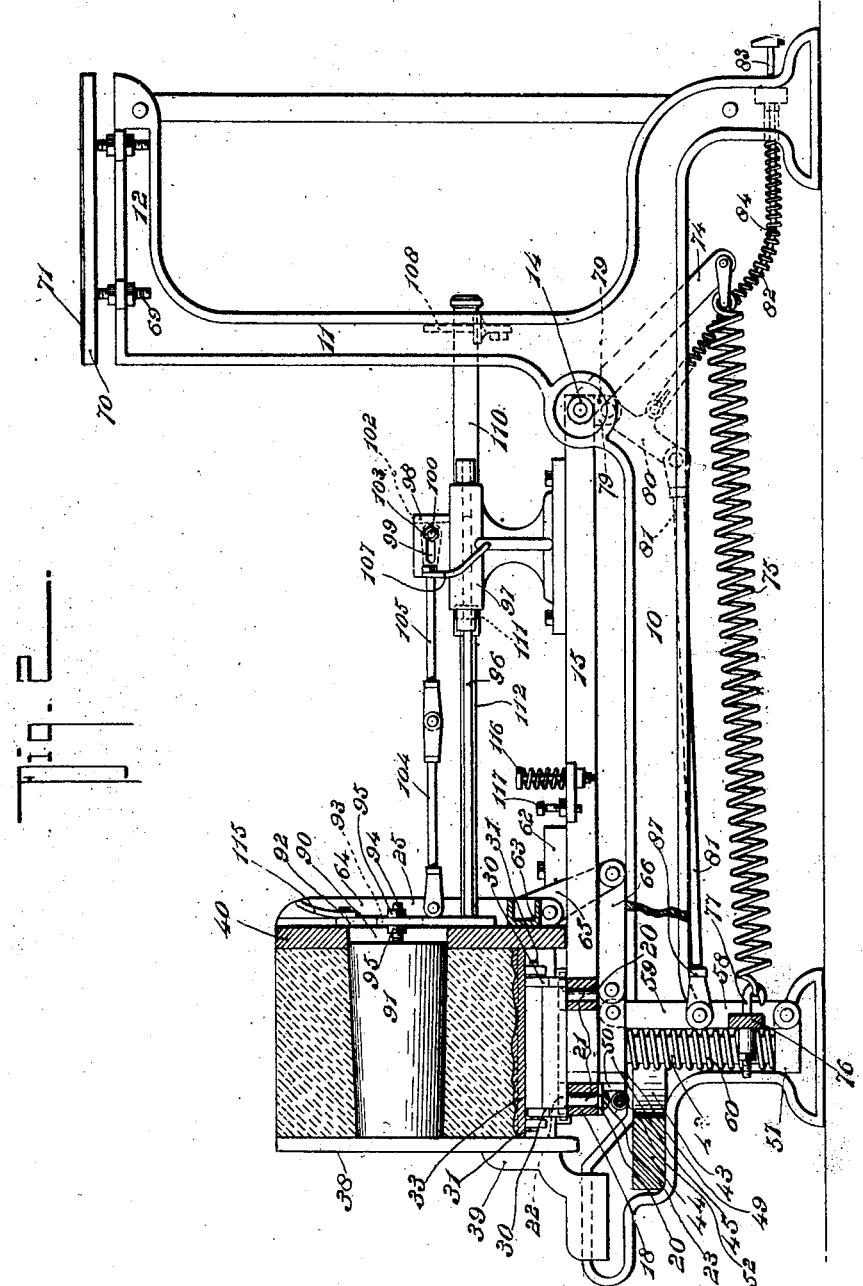
John Miller
Arthur M. Haight and
Walter T. Smith
Witnesses
Inventors
by
Attorneys

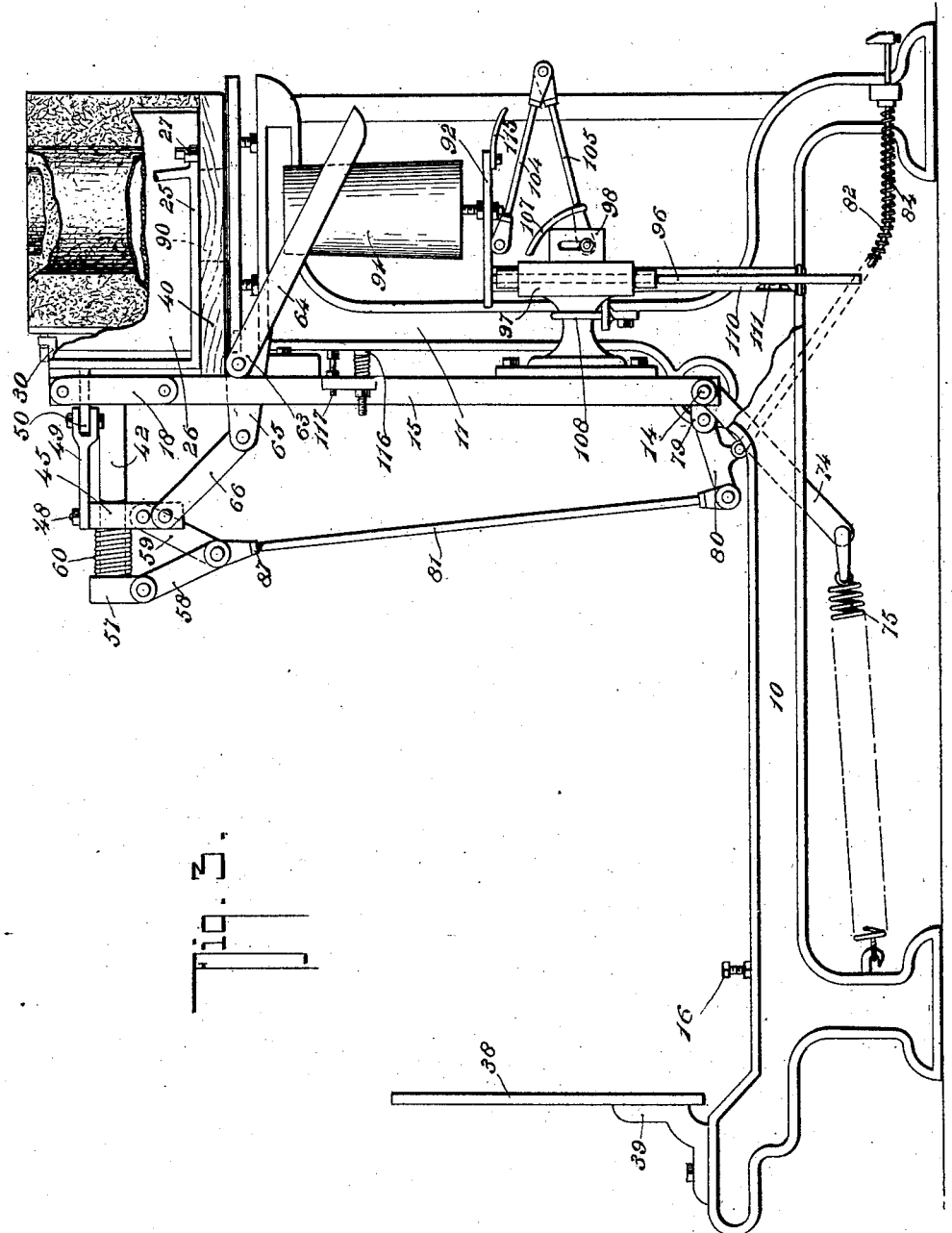

No. 840,006. PATENTED JAN. 1, 1907.
J. MILLER, A. M. HAIGHT & W. T. SMITH.
MACHINE FOR MAKING CONCRETE BUILDING BLOCKS.
APPLICATION FILED SEPT. 11, 1905.
6 SHEETS—SHEET 4.
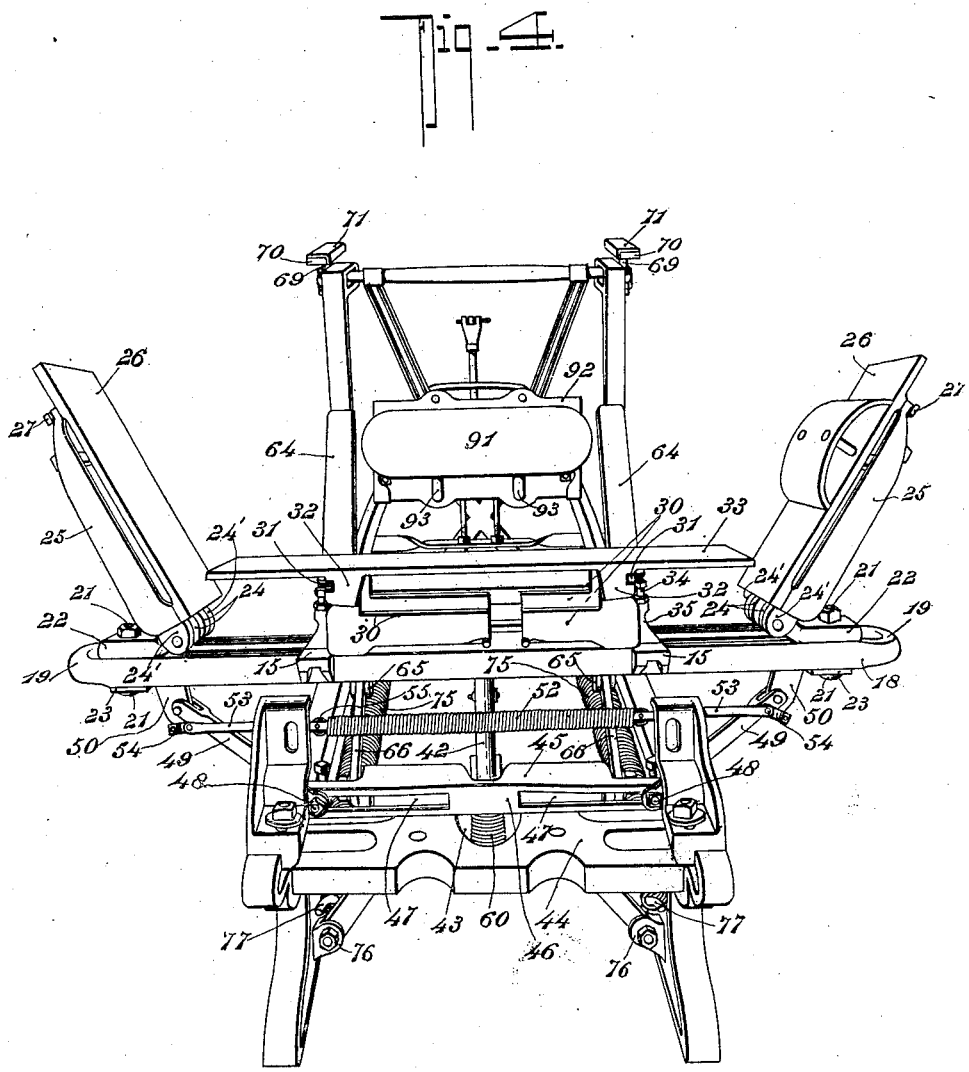
John Miller
Arthur M. Haight and
Walter T. Smith
Inventors
Witnesses
by C. A. Snow & Co.
Attorneys

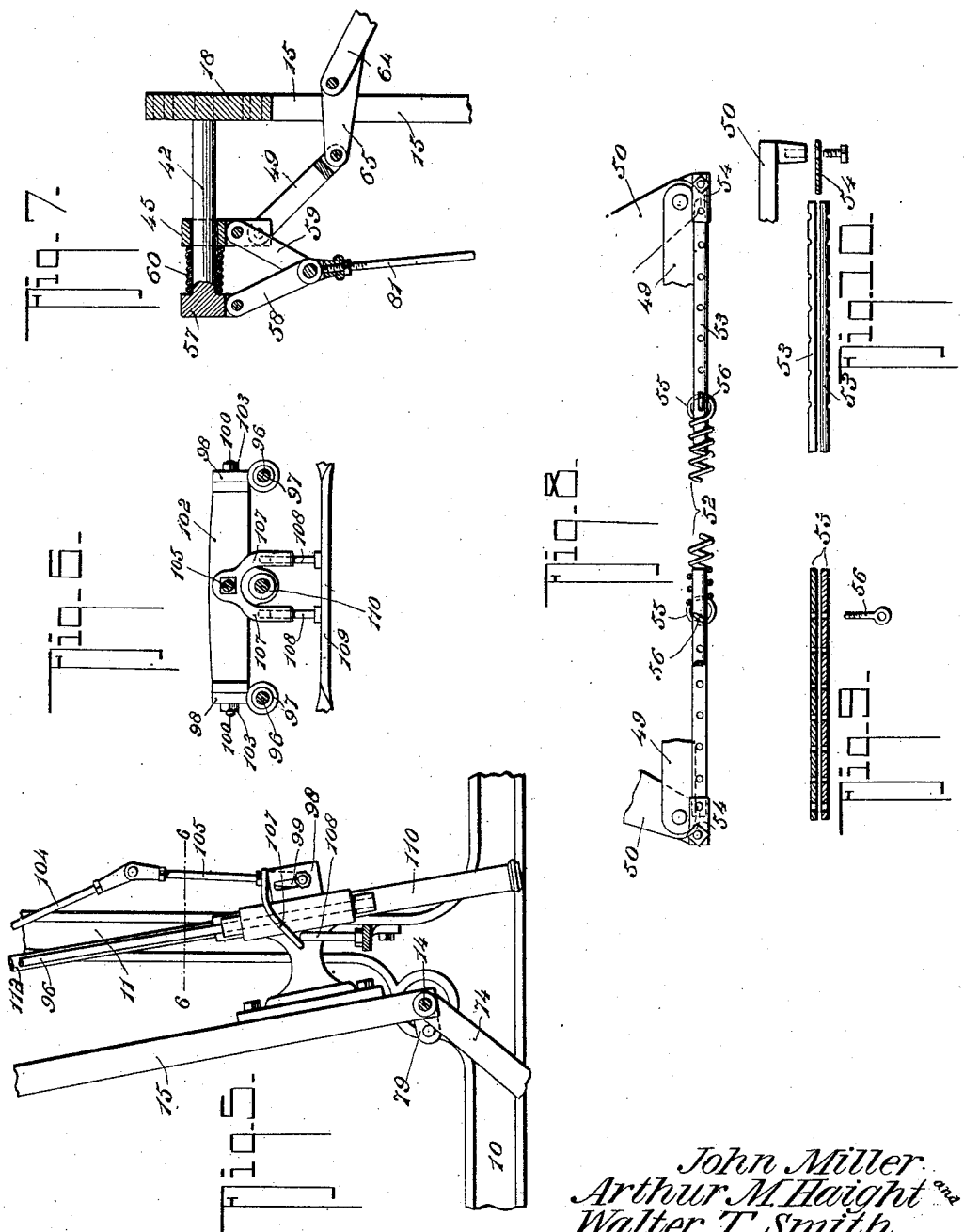

No. 840,006. PATENTED JAN. 1, 1907.
J. MILLER, A. M. HAIGHT & W. T. SMITH.
MACHINE FOR MAKING CONCRETE BUILDING BLOCKS.
APPLICATION FILED SEPT. 11, 1905.
6 SHEETS—SHEET 6.
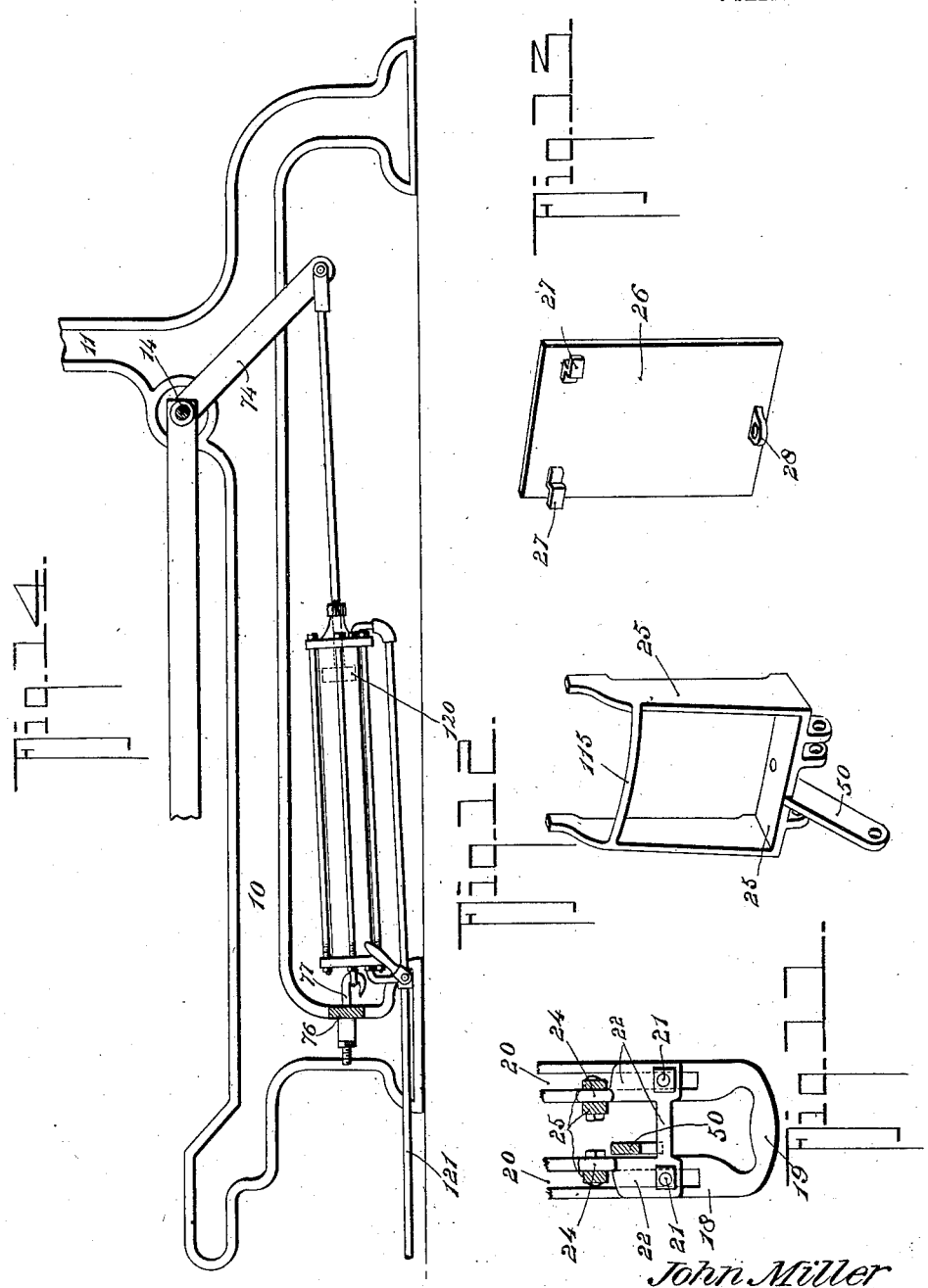
Witnesses
Inventors
John Miller
Arthur M. Haight and
Walter T. Smith.
by C. A. Snow & Co.
Attorneys

UNITED STATES PATENT OFFICE.

JOHN MILLER, ARTHUR M. HAIGHT, AND WALTER T. SMITH, OF JACKSON, MICHIGAN, ASSIGNORS, BY MESNE ASSIGNMENTS, TO PERRY B. MILES, OF JACKSON, MICHIGAN.

MACHINE FOR MAKING CONCRETE BUILDING-BLOCKS.

No. 840,006.     Specification of Letters Patent.     Patented Jan. 1, 1907.

Application filed September 11, 1905. Serial No. 277,943.

*To all whom it may concern:*

Be it known that we, JOHN MILLER, ARTHUR M. HAIGHT, and WALTER T. SMITH, citizens of the United States, residing at Jackson, in the county of Jackson and State of Michigan, have invented a new and useful Machine for Making Concrete Building-Blocks, of which the following is a specification.

This invention relates to machines for manufacturing building-blocks from concrete and other plastic compositions, and has for its principal object to provide a mechanism that will be automatic in its operation, the movable members of the mold opening to release the molded block and closing to readjust the parts to position for each molding operation.

A further object of the invention is to provide a device of this class in which the mold-box is movable bodily to effect the discharge of the molded block.

A still further object of the invention is to provide a machine in which the pallet forms one of the vertical sides of the mold-box while the latter is in molding position and which is turned, together with the mold-box and block, until it assumes a horizontal position with the block resting thereon.

A still further object of the invention is to provide a novel form of machine in which the removable pallet board is provided with openings for the reception of a movable core member, both the core and the pallet moving with the mold-box until the pallet has assumed a horizontal position and supports the block, and in this connection a further object is to provide means for automatically removing the core from the finished block, so that the pallet and block may be removed and carried to the drying-floor.

A still further object of the invention is to provide a machine that may be quickly adjusted and arranged to manufacture blocks of any shape and size.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation, partly in section, of a machine constructed in accordance with the invention, the parts being shown in molding position. Fig. 2 is a similar view showing further details in section. Fig. 3 is an elevation, partly in section, showing the parts in the position assumed when a block is to be discharged. Fig. 4 is a perspective view looking from the end of the machine, showing the mold open. Fig. 5 is a sectional elevation of a portion of the machine, illustrating principally the automatic mechanism for releasing the core. Fig. 6 is a sectional plan view of a portion of the same on the line 6 6 of Fig. 5. Fig. 7 is a sectional elevation of a portion of the mechanism employed for clamping and releasing the pallet member. Fig. 8 is a detail view of the adjustable spring-actuated rod that tends to move the end walls of the mold to open position. Fig. 9 is a sectional plan view of a portion of such rod. Fig. 10 is a plan view of another portion of the rod, illustrating details of the connections. Fig. 11 is a detail sectional plan showing one end of the main plate on which the mold-box is supported. Fig. 12 is a detail perspective view of one of the carrying-frames of the end plates of the mold. Fig. 13 is a detail perspective view of the outer face of one of the end walls of the mold detached. Fig. 14 is a detail sectional view of the lower portion of the machine, showing the employment of a fluid-pressure cylinder for moving the mold and mold-carrying frame.

Similar numerals of reference are employed to indicate corresponding parts throughout the several figures of the drawings.

The frame 10 of the machine comprises opposite side members each provided with a vertical standard 11, and at the upper ends of the standards are horizontally-disposed arms 12, that form supports for the pallet and the finished block at the completion of the molding operation. The two side members of the frame are connected by transverse stay and brace members of any suitable construction, and said frame has bearings for the reception of a shaft 14, carrying a rocking frame 15, that may be moved from the horizontal position shown in Fig. 2 to the vertical position shown in Fig. 3. This frame carries the mold-box from the molding position shown in Fig. 2 to the block-discharging position shown in Fig. 3, and when said frame is moved to the horizontal position it rests on top of screws 16, carried by the fixed frame, the screws being adjusted in order to stop the frame in proper position.

Secured to or formed integral with the outer end of the frame 15 is a transversely-extending plate 18, the opposite ends of which project some distance beyond the sides of the frame and terminate in handles 19, which may be grasped in starting the movement of the pivoted frame from one position to the other. The plate 18 is provided with a plurality of parallel slots 20, extending transversely of the machine and arranged for the passage of bolts 21, by which brackets 22 may be secured to the upper face of the plate, the bolts passing through suitable cross bars or blocks 23 at the bottom of the plate, and these brackets may be adjusted toward and from each other in order to regulate the length of the block to be molded. Each of the brackets 22 is provided with perforated ears 24, to which is pivoted a substantially U-shaped frame 25, that is arranged to form a support for one of the end plates 26 of the mold. The plates 26 are detachable in order that plates of different size and shape may be employed, and to the rear of each plate are arranged lugs 27, that fit over the end portions of the arms of the frame 25, the lugs being arranged near the upper portion of the end plate. The lower end of said end plate is provided with a rearwardly-extending lug 28, through which a suitable securing-bolt 29 may be passed in order to firmly hold said plate in position. The plate 18 further forms a support for a pair of detachable U-shaped frames 30, that are mounted on the upper surface of the plate and are provided with suitable lugs 31, arranged to enter recesses formed in downwardly-extending lugs 32, that are carried by the bottom plate 33 of the mold. The frames 30 are substantially U-shaped in form and are confined in place by suitable bolts 34, that extend into brackets 35, carried by the plate 18, and by turning these bolts the frames 30 may be rocked on the plate 18 in order to positively force the lugs 31 into the recesses of the lugs 32. These frames 30 are made interchangeable, a number of sets of frames of different sizes being employed in connection with each machine in order to adjust the vertical height of the plate 33 in accordance with the size and character of the block to be molded. The plates 33, which form the bottom of the mold-box during the molding operation, may be ornamental in character and arranged to represent dressed stone, panels, or any required design. These three members—that is to say, the bottom plate 33 and the end plates 26—constitute three of the walls of the mold, the remaining two being formed by a plate 38, rigidly secured to brackets 39, carried by the frame, and a removable pallet 40, which is supported in vertical position during the molding operation and afterward forms a support for the block as the latter is removed from the machine and transferred to a drying-floor. Rigidly secured to the central portion of the plate 18 is a stem 42, which when the apparatus is in molding position passes through a suitable recess 43, formed in the transverse brace-bar 44 of the frame. Slidably mounted on the stem 42 is a block 45, at one edge of which is a flange 46, having a pair of slots 47 for the reception of pins or bolts 48, carried at the inner ends of links 49. The outer ends of these links project beyond the sides of the frame and are connected to the lower ends of arms 50, that are rigidly secured to the U-shaped frame 25, the construction being such that sliding movement of the block 45 on the spindle will result in turning of the frames 25 with their pivot-ears 24' as axes. The lower ends of the arms 50 are held together by a tension-spring 52, the opposite ends of which are adjustably secured to the arms by sectional rods 53 and links 54. The rods 53 are each formed in two sections spaced for the passage of the end coil 55 of the end of the spring, and each section of the rod is provided with a series of openings for the passage of a pin 56, which extends through the end coil 55, thus affording a convenient means for adjusting the stress of the spring. The function of the spring is to open the end plates 26 of the mold-box after the latter has been moved to the discharging position; but during the molding operation this is prevented by the connection between the pins or bolts 48 and the block 45, it being observed that the slots 47 permit adjustment of the positions of the pins or bolts 48 in order to permit the manufacture of blocks of different shape or size.

Rigidly secured to the lower end of the stem 42 is a block 57, that is connected to the block 45 by a pair of links 58 59, arranged to form a toggle-joint, and when these links are in alinement with each other, as shown in Fig. 2, the block 45 is held close to the lower face of the plate 18, and the end walls or plates of the mold-box are held in closed or vertical position. In order to assist in forcing the block 45 inward or to closing position, a helical compression-spring 60 is placed around the stem 42 and has its opposite ends bearing, respectively, on the blocks 45 and 57. Adjustably secured to the side bars of the frame 15 are two brackets 62, to which is pivoted a U-shaped frame 63, having a pair of parallel arms 64 for the support of the pallet 40. Projecting from this frame is a pair of arms 65, that are connected by two links 66 to pivot-lugs on the forward edge of the block 45, and as said block moves outward toward the plate 12 the frame 63 will be locked and the arms 64 on said frame will move outward from the mold-box, this movement occurring only, however, after the box has been swung to a position above the arms 12 and the molded block is to be discharged.

The arms 12 are provided with flanges through which extend bolts 69, the upper ends of which are secured to vertically-adjustable bars 70, onto which the pallet-board and block are delivered after the molding operation. These bars 70 are provided with a lining or covering 71, formed of felt or some yieldable material, in order to lessen the jar and shock when the pallet-board comes into contact with the bars. The bars 70 may be adjusted by turning the nuts 72 in order to raise or lower said bars.

The side frames or standards 11 are spaced from each other for a distance greater than the width of the frame 63, and when the frame 15 moves to the vertical position the arm 64 will pass between the standards, while the pallet-board will rest on the cushion-bars 70. After this the mold-box is opened for the delivery of the block.

To assist in raising the frame 15 to the vertical position, said frame is provided with a pair of arms 74, that are connected by tension-springs 75 to lugs 76, projecting inward from the side frames, the connection being preferably formed of adjustable hook-bars 77. These springs are placed under stress when the frame 15 is moved from the vertical to the horizontal position and act as cushions to prevent abrupt downward movement of the frame, while during the upward movement of the frame the springs in returning to normal position will tend to raise the frame.

Pivoted between a pair of lugs 79 near the axis of movement of the frame 15 is a link 80, the outer end of which is connected by a rod 81 to the pivotal connection between the links 58 and 59, and said link 80 is connected at a point intermediate its ends to one end of a spring 82, the opposite end of which is secured to a rod 84, carried by the lower front portion of the frame, said spring being partly guided by the inwardly-extending portion of said rod. During movement of the frame 15 from the horizontal to the vertical position this spring 82 will be placed under stress, and when the parts have finally assumed the position of rest, the pallet-board being supported by the bars 70, the stress of the spring will be sufficient to break the toggle-joint 58 59, and by pulling the block 45 outward the arm 64 of frame 63 will be rocked down below the pallet-board and the end plates of the mold-box will be moved outward from the block, leaving the latter free and in position to be removed with the pallet-board as a support. This operation may be assisted by a pair of handles 87, projecting from the opposite sides of the rod 81, and quick downward thrust of the handles breaking the toggle-joint and the spring 82 completing the movement and forcing the movable parts of the mold-block to open position. During this movement from the horizontal to the vertical position the vertical plate 38 retains its position, said plate being rigidly held in place by the brackets 39.

The pallet-boards may be of any desired shape and size, it being intended to employ a large number of boards in connection with each machine. Each board is provided with an opening 90 for the passage of a core 91, that may be of any desired shape or size, and, if necessary, one, two, or more cores may be employed for each block.

The core or cores 91 may be secured to a carrying-plate 92 in any suitable manner, preferably by providing slots 93 in the plate, the slots receiving bolts 94, extending from the core, and said bolts being locked in adjusted position by nuts 95. The core-carrying plate 93 is secured to the outer ends of a pair of rods 96, that pass through guiding-openings formed in brackets 97, that are adjustably secured to the frame 15, there being two of such rods in the present instance. These brackets are provided with lugs 98, having slots 99 for the reception of bolts 100, that extend from the opposite ends of a cross-bar 102 and are locked in adjusted position by nuts 103. Extending between the cross-bar 102 and the core-carrying plate 92 is a toggle-lever formed of two pivotally-connected links 104 105, and when these links are in alinement the core is supported in molding position. The lower link 105 carries a U-shaped cam 107, having two curved arms which are arranged for engagement with a pair of adjustable studs 108, carried by a cross-bar 109, which extend between the two vertical standards 11. When the frame 15 swings upward from the horizontal to the vertical position, the cam-shaped ends of the frame 107 engage against the studs 108 and the toggle-joint is broken, so that the core-carrying plate is free to descend, this initial movement being sufficient to loosen the core, and said core is tapered from end to end to facilitate the operation. After the toggle is broken the core-carrying plate and core may descend by gravity until the core has been moved down below the bottom of the mold-box.

In order to prevent abrupt downward movement of the core and core-carrying plate, the standards 97 form a support for an elongated cylinder 110, which forms a dash-pot arranged for the reception of a piston 111, carried by a rod 112, the upper end of which is secured to the core-carrying plate, and this dash-pot is so arranged that the core and its carrying-plate can move down slowly and without danger of shock or breakage of the parts.

At the front of the core-carrying plate is arranged a handle 115, which may be grasped in restoring the core to initial position.

In the operation of the device, the parts being in the position shown in Fig. 2, the concrete or other material is shoveled into the mold and tamped down either by hand or by a mechanically or pneumatically operated tool, and then the surface material is troweled off. The frame 15 is then swung from the horizontal to the vertical position, spring-pressed bars 116, carried by said frame, coming into contact with the vertical standards 11, and the movement being completed when adjustable stops 117, carried by the frame, engage with said standards. During the latter part of this movement the cam-shaped arms 107 engage the studs or pins 108 and the toggle-joint is broken, allowing the core-carrying plate 92 to descend, the core being withdrawn entirely from the mold-box. The spring 82 at this time serves to break the toggle-joint 58 59 and move the block 45 outward, thus lowering the arm 64 from the pallet-board and separating the end plate of the mold, so that the finished block is supported solely by the pallet-board and may be carried over on the board to a suitable drying-floor. The frame 15 is then swung down to the horizontal position, as shown in Fig. 1, after which the core-carrying plate is pulled up until the core is again properly entered in the mold and the members 104 and 105 of the toggle are again in alinement. During the latter part of the downward movement of the frame 15 the block 45 strikes against the fixed bar 44 and the movement of said block is stopped, while downward movement of the frame continues, and during this movement the end plates are moved up to the vertical position and the arm 64 moved up to engage a pallet-board previously placed in position, so that the parts are again ready for the molding of another block.

In some cases the springs 75 may be replaced by one or more pneumatic cylinders 120, as shown in Fig. 14, the cylinders being supplied with air by a valved pipe 121, and by suitably operating the valve the pneumatic cylinders will elevate and lower the frame, thus rendering it unnecessary to employ any manual power in this portion of the operation.

Having thus described the invention, what is claimed is—

1. In a block-molding machine, a mold-block including a removable pallet forming one of the side walls of the mold during the molding operation, means for moving the mold bodily to turn the pallet to a horizontal position, and mold-opening means placed under stress during movement of the mold from molding to discharging position and arranged to automatically open the mold at the completion of the movement toward discharging position.

2. In a machine of the class described, the combination with a mold-box having movable end members, of means for turning the mold bodily to a discharging position, and means placed under stress during the movement to discharging position for automatically opening said end members.

3. In a machine of the class described, a mold-box, having a perforated side wall, said mold-box being movable between a molding position and a point of discharge, and a movable core insertible in horizontal direction into the box while the latter is in horizontal position, and removable in a vertical direction from the box while the latter is in discharging position.

4. In a machine for forming hollow blocks of plastic material, a mold-box, a core member for forming a horizontal passage in the block, and means for turning the block until the core assumes a vertical position prior to its removal from said block.

5. In a machine for forming hollow blocks from plastic material, a mold-box, a core for forming a horizontal air-chamber in the block, a pallet forming one of the side walls of the mold-box during a molding operation, and means for turning the mold-box and block until the pallet assumes a horizontal position with the block resting thereon and the core assumes a vertical position prior to its removal from the block.

6. In a block-forming machine, a mold including a removable pallet arranged to form one of the side walls of the mold during the molding operation, means for holding the pallet in mold-box-forming position, a support onto which the pallet is delivered, means for turning the mold-box until the pallet assumes a horizontal position resting on said support, and means for releasing the pallet-holding means.

7. In a block-forming machine, a mold-box including a pallet arranged to form one of the side walls of the box during the molding operation, means for holding the pallet in mold-box-forming position, the mold-box being movable with the molded block until the pallet assumes a position at an angle to the molding position, a support for receiving the pallet, and means for moving the pallet-holding means to release position.

8. In a block-forming machine, a mold-box including a removable pallet forming one of the side walls of the box during the molding operation, means for holding the pallet in mold-box-forming position, a rigid back plate, a bottom plate, and movable end plates, said mold-box being bodily movable with the block until the pallet assumes an approximately horizontal position with the block resting thereon, a support for receiving the pallet, and means for releasing the pallet and moving the end plates to permit the return of the mold-box to initial position in advance of the removal of the pallet and block from the support.

9. In a block-forming machine, a mold-box including a removable pallet arranged to form one of the side walls of the box during the molding operation, means for holding the pallet in mold-box-forming position, said mold-box being bodily movable with the finished block until the pallet assumes a horizontal position, a support for receiving the pallet, and means for opening the mold-box to permit the return of the same to molding position in advance of the removal of the pallet from the support.

10. In a block-forming machine, a mold-box including a movable pallet forming one of the side walls of the box during a molding operation, means for holding the pallet in mold-box-forming position, a pallet-support, over which the mold-box is swung bodily during the block-discharging movement, and mechanism for swinging the pallet-holding means downward to free the pallet and permit the return of the box to molding position.

11. In a block-molding machine, a pivoted carrying-frame, a slotted plate forming part of said frame, a bottom plate adjustably secured to said slotted plate, a pair of brackets adjustably secured to the slotted plate, frames pivoted on said brackets, detachable end plates carried by the frame, a pallet constituting one of the side walls of the mold, means pivoted to the frame for holding the pallet in mold-box-forming position, a rigid back plate, a stem carried by the slotted plate, a slidable block on said stem, and means connecting said slidable block to the pallet-holding means, and to the end-plate-supporting frames, movement of the block on the stem serving to open and close the mold.

12. In apparatus of the class described, a movable frame, a slotted plate forming parts of said frame, a bottom plate having projecting lugs, detachable brackets secured to the slotted plate and having recessed lugs for the reception of the lugs of the bottom plate, a pair of brackets secured to the ends of the slotted plate, end plates pivoted on said brackets, a side plate, a stem carried by the slotted plate, a block slidably mounted on the stem, and means for connecting said sliding block to the end plates and the side member.

13. In apparatus of the class described, a movable frame, a mold supported thereby and including a plurality of movable members, an operating-block common to all of said members, and a fixed stop with which said block engages as the box is moved to molding position to thereby move the members of the box to closed position.

14. In a block-forming machine, a movable frame, a mold-box carried thereby and including a plurality of movable members, a stem carried by said frame, a movable block on said stem, means for connecting said block to the movable members of the box, a fixed block or pallet on the stem, toggle-links connecting the fixed and movable blocks, and means for breaking the toggle to open the mold-box.

15. In mechanism of the class described, a movable frame, a mold-box carried thereby and including a plurality of movable members, a stem carried by the frame, a movable block, and a fixed block carried by the stem, links forming connections between the movable block and the movable members of the box, toggle-links connecting the fixed ends of the blocks, means for breaking the toggle to move said members to open position, and a fixed stop with which the movable block engages to force the members of the blocks to closed position.

16. In mechanism of the class described, a pivotally-mounted frame, a mold-box supported thereby and including a plurality of movable sections, a stem carried by the frame, fixed and movable blocks mounted upon the stem, means for connecting the movable block to the movable sections of the mold-box, a spring surrounding the stem and tending to move the sections of the box to molding position, toggle-links connecting the fixed and movable blocks, a rod connected to said links, a lever pivoted to the frame and connected to the rod, and means for operating said lever and breaking the toggle-joint to force the movable members to open position.

17. In a block-forming machine, a pivoted frame, a mold-box carried thereby and including a removable pallet-board forming one of the side walls of the box when the latter is in molding position, said pallet-board having a core-receiving opening, a core supported by the frame and movable through said opening into the box, means for moving the frame until the pallet-board has assumed a substantially horizontal position, and the core a substantially vertical position, and means for removing the core from the mold-box.

18. In a machine of the class described, a mold-box, a vertically-movable core, a spring tending to withdraw the same from the box, toggle-levers supporting the core in molding position, and means for breaking the toggle-joint to permit the spring to withdraw the core.

19. In a block-forming machine, the combination with a pivotally-mounted frame, of a mold-box supported thereby, a movable core, a core-carrying plate to which said core is adjustably secured, a pair of guide-bars connected to the plate, brackets supporting said guide-bars, a toggle-lever for holding the core in molding position, and means for automatically breaking the toggle and withdrawing the core.

20. The combination with a mold-box, of a core, a core-carrier, a pair of guide-rods connected to the core-carrier, a toggle-lever supporting the core-carrier, means for breaking the toggle, and a dash-pot for retarding movement of the core.

21. The combination with a pivoted frame, of a mold-box supported thereby, a movable core, a core-carrier, a toggle for the support of the core-carrier, a cam-arm projecting from the toggle, and a stationary stud disposed in the path of movement of the arm and serving to break the toggle.

In testimony that we claim the foregoing as our own we have hereto affixed our signatures in the presence of two witnesses.

JOHN MILLER.
ARTHUR M. HAIGHT.
WALTER T. SMITH.

Witnesses:
  JOHN McDEVITT,
  H. E. COPPINS